United States Patent
Liu et al.

(10) Patent No.: US 11,175,668 B2
(45) Date of Patent: Nov. 16, 2021

(54) NAVIGATION METHOD AND APPARATUS, AND TERMINAL DEVICE

(71) Applicant: CLOUDMINDS (SHANGHAI) ROBOTICS CO., LTD., Shanghai (CN)

(72) Inventors: Zhaoxiang Liu, Beijing (CN); Shiguo Lian, Beijing (CN)

(73) Assignee: CLOUDMINDS (SHANGHAI) ROBOTICS CO., LTD., Shanghai (CN)

( * ) Notice: Subject to any disclaimer, the term of this patent is extended or adjusted under 35 U.S.C. 154(b) by 169 days.

(21) Appl. No.: 16/436,086

(22) Filed: Jun. 10, 2019

(65) Prior Publication Data
US 2019/0294172 A1 Sep. 26, 2019

Related U.S. Application Data

(63) Continuation of application No. PCT/CN2016/113256, filed on Dec. 30, 2016.

(51) Int. Cl.
*G05D 1/00* (2006.01)
*G05D 1/02* (2020.01)
(Continued)

(52) U.S. Cl.
CPC .......... *G05D 1/0214* (2013.01); *G01C 21/28* (2013.01); *G01C 21/34* (2013.01); *G05D 1/0238* (2013.01); *G05D 1/0246* (2013.01)

(58) Field of Classification Search
CPC .... G05D 1/0214; G05D 1/0238; G05D 1/024; G05D 1/06; G05D 1/282; G05D 2201/02; G01C 21/28; G01C 21/34
See application file for complete search history.

(56) References Cited

U.S. PATENT DOCUMENTS 9,098,753 B1 * 8/2015 Zhu .................. G06K 9/00805
9,221,396 B1 * 12/2015 Zhu .......................... G01S 7/40
(Continued)

FOREIGN PATENT DOCUMENTS

CN   103884332 A   6/2014
CN   105843225 A   8/2016
(Continued)

OTHER PUBLICATIONS

Lee, J. et al, "Real-Time,Cloud-Based Object Detection for Unmanned Aerial Vehicles," 2017 First IEEE International Conference on Robotic Computing (IRC), Taichung,2017, pp. 36-43, doi: 10.1109/IRC.2017.77.[online], [retrieved on Jan. 13, 2021], Retrieved at <https://ieeexplore.ieee.org/document/7926512> (Year: 2017).*

(Continued)

*Primary Examiner* — Peter D Nolan
*Assistant Examiner* — Peter Y Ning
(74) *Attorney, Agent, or Firm* — Tucker Ellis LLP

(57) ABSTRACT

The embodiment of the present invention provides a navigation method and apparatus, and a terminal device, relating to the technical field of navigation, and for reducing or avoiding the impact of network delay on real-time obstacle detection and avoidance. The method includes: detecting an obstacle to obtain first obstacle information; obtaining scene information and sending the scene information to a remote server, so that the remote server obtains second obstacle information according to the scene information, wherein the accuracy of the second obstacle information is greater than the accuracy of the first obstacle information; and if the second obstacle information sent by the remote server is not received, avoiding the obstacle according to the first obstacle information. The embodiment of the present invention is applied to navigation.

3 Claims, 3 Drawing Sheets

(51) Int. Cl.
    *G01C 21/28*     (2006.01)
    *G01C 21/34*     (2006.01)

(56) References Cited

U.S. PATENT DOCUMENTS

| | | | |
|---|---|---|---|
| 2016/0124429 A1 | 5/2016 | Schultz | |
| 2017/0090478 A1* | 3/2017 | Blayvas | G07C 5/0808 |
| 2019/0266029 A1* | 10/2019 | Sathyanarayana | G06F 9/542 |
| 2019/0354111 A1* | 11/2019 | Cheng | G05D 1/0285 |
| 2019/0384304 A1* | 12/2019 | Towal | G05D 1/0221 |
| 2020/0225673 A1* | 7/2020 | Ebrahimi Afrouzi | G05D 1/0214 |
| 2021/0064043 A1* | 3/2021 | Kulkarni | H04W 84/18 |
| 2021/0089040 A1* | 3/2021 | Ebrahimi Afrouzi | A47L 9/2894 |
| 2021/0281977 A1* | 9/2021 | Ebner | G01C 21/206 |

FOREIGN PATENT DOCUMENTS

| | | | |
|---|---|---|---|
| CN | 106020204 A | 10/2016 |
| CN | 106020232 A | 10/2016 |
| CN | 205750530 U | 11/2016 |

OTHER PUBLICATIONS

International Search Report from corresponding International Patent Application No. PCT/CN2016/113526, dated May 31, 2017, 6 pages inclusive of translation.

\* cited by examiner

NAVIGATION METHOD AND APPARATUS, AND TERMINAL DEVICE

CROSS-REFERENCE TO RELATED APPLICATIONS

The present application is a continuation application under 35 U.S.C. § 120 of International Application No. PCT/CN2016/113526 filed on Dec. 30, 2016, the contents of which are incorporated herein by reference.

FIELD OF THE INVENTION

The present invention relates to the field of navigation technology, and in particular, to a navigation method and apparatus, and terminal device.

BACKGROUND OF THE INVENTION

With the rapid development of the navigation technology, the navigation range extends from the traditional simple path information to road travel information, and implementation of accurate real-time obstacle detection and avoidance has become a basic function in navigation.

Due to the limitation of computing resources and storage resources in a terminal device, it is very difficult for the terminal device to achieve independent obstacle detection and avoidance. Generally, in a real-time obstacle detection and avoidance process, some complicated operations need to be sent to a remote server, thereby effectively reducing the requirements of the terminal device for the computing resources and the storage resources. However, to place some complicated operations in the remote server, stable communication signal quality between the terminal device and the remote server is required, thereby ensuring that a communication message between the terminal device and the remote server may be transmitted in real time, if the communication signal between the terminal device and the remote server has a delay, the terminal device is unable to detect and evade a sudden dangerous situation, thereby causing danger. For example, if the terminal device is an automatic drive vehicle, the network fails in the navigation process, then the automatic drive vehicle may be unable to continue the travel, and may even have an accident. Therefore, how to reduce or avoid the impact of network delay on real-time obstacle detection and obstacle avoidance is a technical problem to be solved urgently.

SUMMARY OF THE INVENTION

The embodiment of the present invention provides a navigation method and apparatus, and a terminal device for reducing or avoiding the impact of network delay on real-time obstacle detection and avoidance.

In order to achieve the above objective, the embodiment of the present invention adopts the following technical solutions:

In a first aspect, a navigation method is provided, comprising:
  detecting an obstacle to obtain first obstacle information;
  obtaining scene information and sending the scene information to a remote server, so that the remote server obtains second obstacle information according to the scene information, wherein the accuracy of the second obstacle information is greater than the accuracy of the first obstacle information; and
  if the second obstacle information sent by the remote server is not received, avoiding the obstacle according to the first obstacle information.

In a second aspect, a navigation apparatus is provided, comprising:
  an obstacle detection module, configured to detect an obstacle to obtain first obstacle information;
  a collection module, configured to obtain scene information;
  a sending module, configured to send the scene information to a remote server, so that the remote server obtains second obstacle information according to the scene information, wherein the accuracy of the second obstacle information is greater than the accuracy of the first obstacle information; and
  an obstacle avoidance processing module configured to, if second obstacle information sent by the remote server is not received, avoid the obstacle according to the first obstacle information.

In a third aspect, a terminal device is provided, comprising: a processor, a memory, a communication interface, an obstacle detection apparatus and a collection apparatus, wherein the memory, the communication interface, the obstacle detection apparatus and the collection apparatus are coupled to the processor, the memory is configured to store a computer execution code, and the computer execution code is configured to control the processor to execute the navigation method.

In a fourth aspect, a computer storage medium is provided, for storing computer software instructions used by the terminal device in the third aspect, which contain program codes designed to execute the navigation method in the first aspect.

In a fifth aspect, a computer program product is provided, which is capable of being directly loaded in an internal memory of a computer and contain software codes, wherein the computer program may implement the navigation method in the first aspect after being loaded and executed by the computer.

According to the navigation method provided by the embodiment of the present invention, the obstacle is detected at first to obtain the first obstacle information, meanwhile the scene information is obtained, and the scene information is sent to the remote server; the remote server may obtain the second obstacle information according to the scene information; the accuracy of the second obstacle information is greater than the accuracy of the first obstacle information. That is, by adoption of the navigation method provided by the embodiment of the present invention, rough information of the obstacle may be obtained by self-detection, and the scene information is sent to the remote server to obtain accurate information of the obstacle, since the calculation process of obtaining the accurate information of the obstacle is performed in the remote server in the embodiment of the present invention, the requirements of the terminal device on computing resources and storage resources may be effectively reduced. In addition, when a delay occurs in the network, resulting in that the second obstacle information sent by the remote server is not received in time, the navigation may be performed according to the first obstacle information to avoid the obstacle. Therefore, the embodiment of the present invention may reduce or avoid the impact of network delay on real-time obstacle detection and obstacle avoidance.

BRIEF DESCRIPTION OF THE DRAWINGS

To illustrate technical solutions in the embodiments of the present invention or the prior art more clearly, a brief introduction on the drawings which are needed in the description of the embodiments or the prior art is given below. Apparently, the drawings in the description below are merely some of the embodiments of the present invention, based on which other drawings may be obtained by those of ordinary skill in the art without any creative effort.

DETAILED DESCRIPTION OF THE EMBODIMENTS

Figure 1:
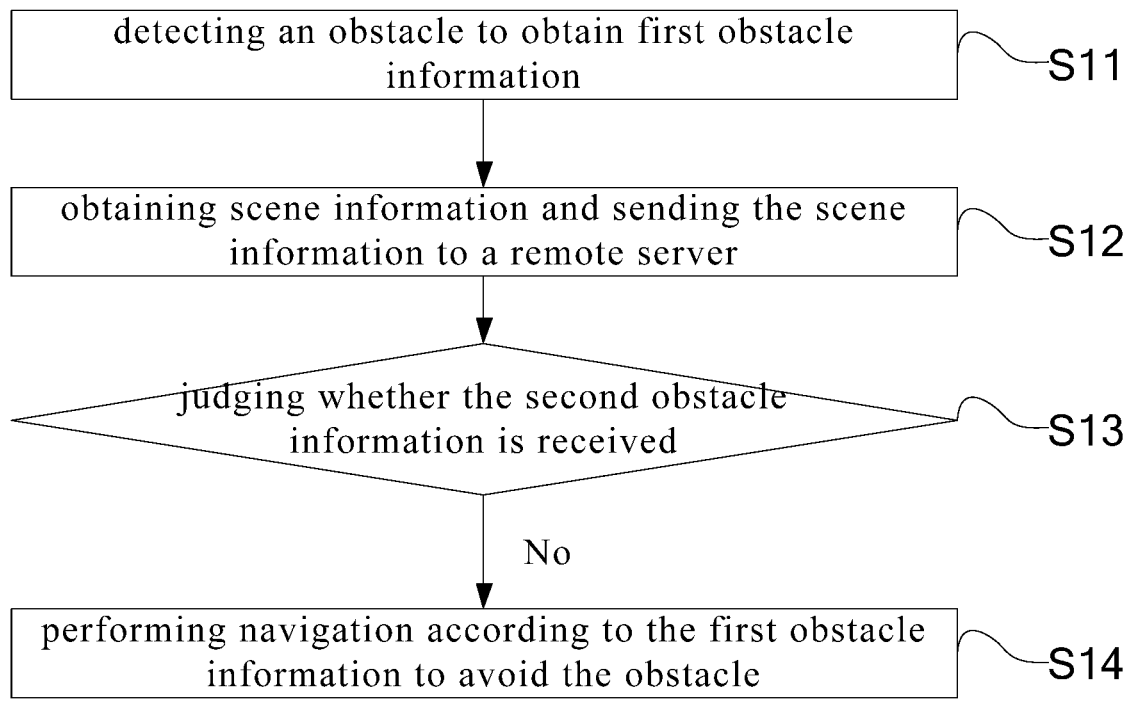
FIG. 1 is a first step flowchart of a navigation method provided by an embodiment of the present invention.

The term "and/or" in the present context is merely an association relationship describing associated objects and indicating the presence of three relationships, for example, A and/or B, which may indicate the following three conditions: A exists separately, A and B exist at the same time, and B exists separately. In addition, the character "/" in the present context generally indicates an "or" relationship between front and back associated objects.

It should be noted that, in the embodiment of the present invention, the words "exemplary" or "for example" or the like are used for meaning examples, example illustration or illustration. Any embodiment or design solution described as "exemplary" or "for example" in the embodiment of the present invention should not be construed as be more preferred or advantageous than other embodiments or design solutions. Properly speaking, the words "exemplary" or "for example" or the like are intended to present related concepts in a specific manner.

It should be noted that, in the embodiment of the present invention, the meaning of "a plurality of" refers to two or more unless otherwise stated.

It should be noted that, in the embodiment of the present invention, "of (English: of)", "corresponding (English: corresponding, relevant)" and "corresponding (English: corresponding)" may sometimes be mixed for use. It should be noted that, when the difference is not emphasized, the meanings to be expressed are the same.

It should also be noted that, in order to facilitate the clear description of the technical solutions of the embodiment of the present invention, in the embodiment of the present invention, the words "first", "second" and the like are used for distinguishing the same items or similar items having basically the same functions and roles, and those skilled in the art may understand that the words "first", "second" and the like do not limit the number and the execution order.

A clear and complete description of technical solutions in the embodiments of the present invention will be given below, in combination with the drawings in the embodiments of the present invention. Apparently, the embodiments described below are merely a part, but not all, of the embodiments of the present invention. All of other embodiments, obtained by those of ordinary skill in the art based on the embodiments of the present invention without any creative effort, fall into the protection scope of the present invention.

The basic principle of the technical solutions provided by the embodiment of the present invention is as follows: in a navigation process, an obstacle is avoided by combining local obstacle detection with remote obstacle detection, accurate obstacle information is obtained by the remote obstacle detection, rough obstacle information is obtained by the local obstacle detection, when second obstacle information cannot be obtained in the case of network delay, navigation may be performed through the rough obstacle information obtained by the local obstacle detection to avoid the obstacle, thereby reducing or avoiding the impact of the network delay on real-time obstacle detection and obstacle avoidance.

An executive body of a navigation method provided by the embodiment of the present invention may be a navigation apparatus or a terminal device. The navigation apparatus may be a central processing unit (Central Processing Unit, CPU), a combination of the CPU and a memory or other hardware, or may be other units or modules in the above terminal device. The terminal device may specifically be a navigator, a blind guide robot, a mobile robot, an automatic drive vehicle, an unmanned aerial vehicle, a smart phone, augmented reality glasses (English name: Augmented Reality, referred to as AR glasses), a portable computer, a pocket computer, a handheld computer, a digital photo frame, a handheld computer or the like. Or, the terminal device may be a personal computer (English full name: personal computer, referred to as PC), a server or the like, which is installed with a software client or a software system or a software application capable of navigating, a specific hardware implementation environment may be a general computer form, or an especially designed integrated circuit (English full name: Application Specific Integrated Circuit, referred to as ASIC) mode, and may also be (English full name: Field Programmable Gate Array, referred to as FPGA), or some programmable expansion platform such as embedded (English name: Tensilica) configurable processor platform, etc.

Based on the above, the embodiment of the present invention provides a navigation method. Specifically, as shown in FIG. 1, the navigation method includes the following steps:

S11. detecting an obstacle to obtain first obstacle information.

Exemplarily, in the step S11, the navigation apparatus or the terminal device may specifically detect the obstacle by one or more of an ultrasonic radar, an ultrasonic radar array, an infrared sensor and an infrared sensor array.

Exemplarily, the first obstacle information may include: the distance of the obstacle and the orientation of the obstacle.

S12. obtaining scene information and sending the scene information to a remote server.

Exemplarily, the scene information obtained in the above step S12 may be specifically: a scene image, a scene infrared detection map, scene ultrasonic detection information, and the like. When the scene information is the scene image, the navigation apparatus or the terminal device may specifically collect the scene image through an image sensor apparatus such as a monocular camera or a binocular camera and the like, so as to obtain the scene image. When the scene information is the scene infrared detection information, the navigation apparatus or the terminal device may specifically obtain the scene infrared detection information through an infrared detector, an infrared detection array and other apparatuses. When the scene information is the scene ultrasonic detection information, the navigation apparatus or the terminal device may specifically obtain the scene ultrasonic detection information through an ultrasonic detection apparatus, an ultrasonic detection array or the like.

Exemplarily, the remote server may specifically be a cloud server or the like.

After the navigation apparatus or the terminal device sends the scene information to the remote server, the remote server obtains the second obstacle information according to the scene information. Furthermore, the accuracy of the second obstacle information is greater than the accuracy of the first obstacle information.

Exemplarily, the second obstacle information may include information such as the distance of the obstacle, the orientation of the obstacle, the size of the obstacle, and the number of obstacles.

Exemplarily, the first obstacle information may be: the obstacle is located 100-150 meters in the forward direction; and the second obstacle information may be: the obstacle is located 135 meters in the forward direction and the volume of the obstacle is 3 cubic meters. The second obstacle information increases the accuracy of the obstacle from two aspects: accuracy (100-150 is specified to 135 meters) and information dimension (increasing the dimension of the volume size of the obstacle).

After receiving the scene information, the remote server may obtain the depth of the scene through calculation, and then detect the distribution of obstacles in the scene. For example, when the navigation apparatus or the terminal device obtains the scene image by collecting the scene image through a binocular camera, the depth of the scene may be calculated by a binocular matching algorithm, and when the navigation apparatus or the terminal device collects the scene image through a monocular camera to obtain the image information of the scene, the depth of the scene image may be calculated by a deep neural network algorithm. After the depth of the scene is calculated, the obstacle detection is performed based on the depth of the scene. The specific detection method may be as follows: setting a plurality of depth thresholds to segment the scene image so as to obtain the contours of obstacles at different depths, and then calculating the distance, size, orientation, number and other information of each obstacle.

It should be noted that, since the accuracy of the second obstacle information in the embodiment of the present invention is greater than the accuracy of the first obstacle information, that is, the first obstacle information in the embodiment of the invention is rough information of the obstacle, and the second obstacle information is the accurate information of the obstacle. In the embodiment of the present invention, the calculation process of obtaining the rough information of the obstacle is performed locally on the navigation apparatus or the terminal device, and the calculation process of obtaining the accurate information of the obstacle is performed in the remote server, so that the embodiment of the present invention can effectively reduce the requirements of the terminal device for computing resources and storage resources.

After the second obstacle information is obtained in the above step S12, the remote server sends the second obstacle information to the navigation apparatus or the terminal device through a network of the remote server and the navigation apparatus or the terminal device. However, since a delay may occur in the network, the navigation apparatus or the terminal device may be unable to receive the second obstacle information sent by the remote server in time.

Therefore, after the navigation apparatus or the terminal device sends the scene information to the remote server, a step S13 is performed.

S13. judging whether the second obstacle information is received.

If the second obstacle information sent by the remote server is not received in the step S13, a step S14 is executed.

S14. performing navigation according to the first obstacle information to avoid the obstacle.

If the second obstacle information is not received, the navigation apparatus or the terminal device only obtains the first obstacle information, that is, the navigation apparatus or the terminal device only obtains the rough information of the obstacle, and at this time, the navigation apparatus or the terminal device cannot formulate an accurate navigation path according to the accurate information of the obstacle, but may send a simple obstacle avoidance instruction according to the rough information of the obstacle, such as: controlling the navigation apparatus or the terminal device to stop traveling, controlling the navigation apparatus or the terminal device to move toward the left or right sides of the obstacle, and the like, therefore, the navigation apparatus or the terminal device may avoid the obstacle in time to avoid the occurrence of danger.

According to the navigation method provided by the embodiment of the present invention, the obstacle is detected at first to obtain the first obstacle information, meanwhile the scene information is obtained, and the scene information is sent to the remote server; the remote server may obtain the second obstacle information according to the scene information; the accuracy of the second obstacle information is greater than the accuracy of the first obstacle information. That is, by adoption of the navigation method provided by the embodiment of the present invention, the rough information of the obstacle may be obtained by self-detection, and the scene information is sent to the remote server to obtain the accurate information of the obstacle, since the calculation process of obtaining the accurate information of the obstacle is performed in the remote server in the embodiment of the present invention, the requirements of the terminal device on computing resources and storage resources may be effectively reduced. In addition, when a delay occurs in the network, resulting in that the second obstacle information sent by the remote server is not received in time, the navigation may be performed according to the first obstacle information to avoid the obstacle. Therefore, the embodiment of the present invention may reduce or avoid the impact of network delay on real-time obstacle detection and obstacle avoidance.

Figure 2:
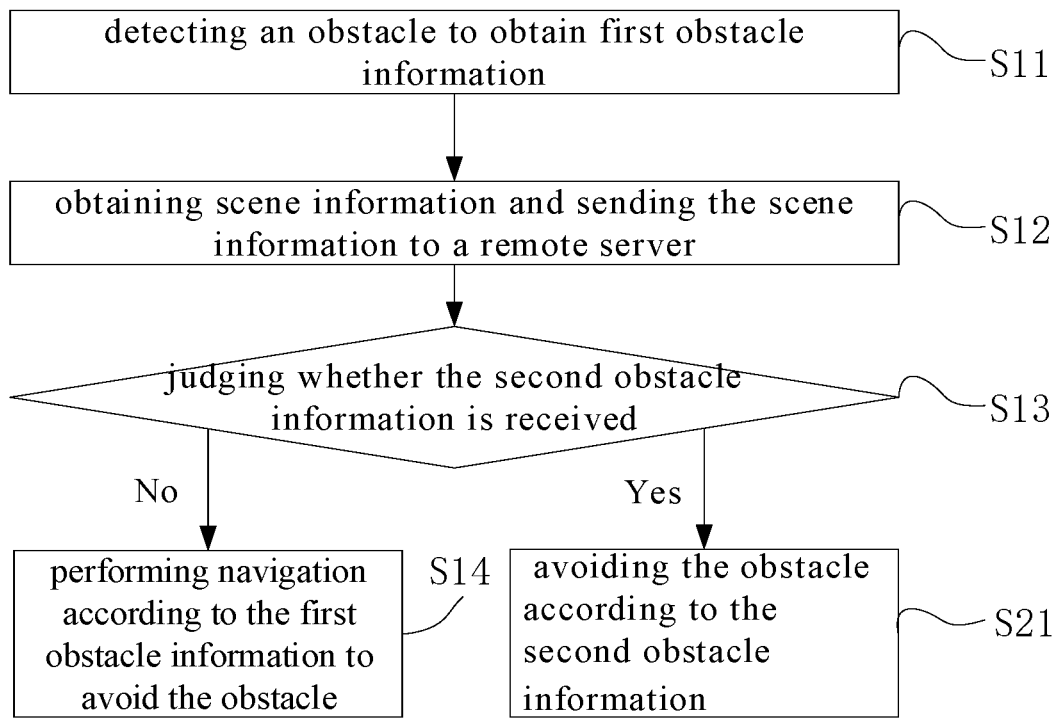
FIG. 2 is a second step flowchart of a navigation method provided by an embodiment of the present invention.

Further, referring to FIG. 2, on the basis of the implementation shown in FIG. 1, when the navigation apparatus or the terminal device receives the second obstacle information sent by the remote server, the navigation method provided by the embodiment of the present invention further includes:

S21. performing navigation according to the second obstacle information to avoid the obstacle.

Specifically, the performing navigation according to the second obstacle information to avoid the obstacle may include: firstly, the navigation apparatus or the terminal device determines a location of itself in a map through a global positioning system (English name: Global Positioning System, referred to as GPS), an inertial measurement unit (English name: Inertial Measurement Unit, referred to as IMU) and a method based on vision simultaneous localization and mapping (English name: Vision Simultaneous Localization And Mapping, referred to as VSLAM); and secondly, the distribution of obstacles is converted to a coordinate system where the map is located to obtain a distribution map of the obstacles. Finally, according to the location and a destination address of itself in the map, local dynamic path planning is performed, and the navigation apparatus or the terminal device travels according to the planned path, thereby implementing obstacle avoidance.

Figure 3:
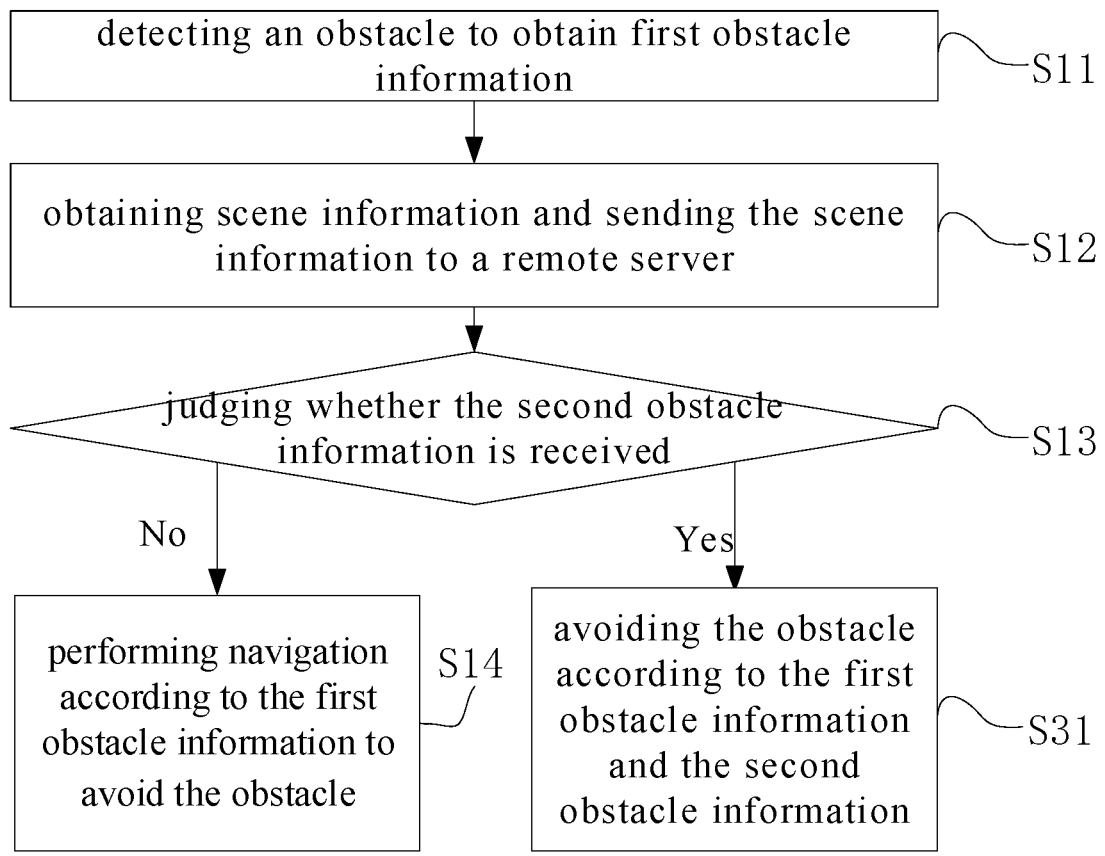
FIG. 3 is a third step flowchart of a navigation method provided by an embodiment of the present invention.

Optionally, as shown in FIG. 3, on the basis of the implementation shown in FIG. 1, when the navigation apparatus or the terminal device receives the second obstacle information sent by the remote server, the navigation method provided by the embodiment of the present invention may further include:

S31. performing navigation according to the first obstacle information and the second obstacle information to avoid the obstacle.

Specifically, avoiding the obstacle according to the first obstacle information and the second obstacle information may include: merging the first obstacle information and the second obstacle information, for example, using the first obstacle information as the supplement of the second obstacle information; and then avoiding the obstacle based on the first obstacle information and the second obstacle information. In addition, in the embodiment of the present invention, the specific implementation process of merging the first obstacle information and the second obstacle information, and performing navigation according to the fused information to avoid the obstacle may be the same as the embodiment shown in FIG. 2, and thus is not repeatedly described herein again. Since navigation is performed according to the first obstacle information and the second obstacle information to avoid the obstacle in the present method embodiment, a more accurate obstacle distribution map may be obtained, and accordingly more accurate navigation may be performed to avoid the obstacle.

Figure 4:
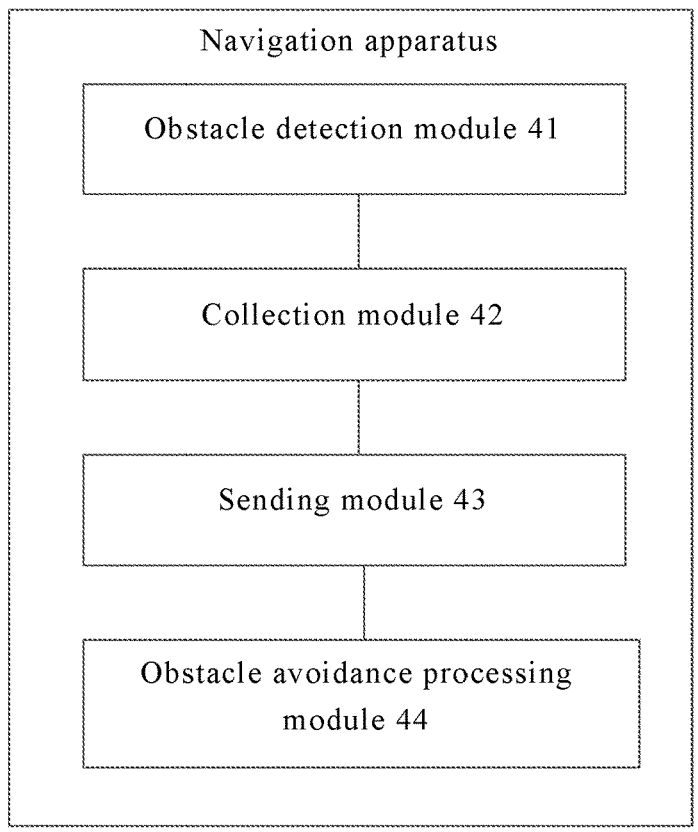
FIG. 4 is a schematic structure diagram of a navigation apparatus provided by an embodiment of the present invention.

In the case that the function modules are divided according to the functions, FIG. 4 shows a possible structural diagram of the navigation apparatus involved in the above embodiment. Referring to FIG. 4, the navigation apparatus 400 includes:

An obstacle detection module 41, configured to detect an obstacle to obtain first obstacle information;

a collection module 42, configured to obtain scene information;

a sending module 43, configured to send the scene information to a remote server, so that the remote server obtains second obstacle information according to the scene information, wherein the accuracy of the second obstacle information is greater than the accuracy of the first obstacle information; and an obstacle avoidance processing module 44 configured to, if second obstacle information sent by the remote server is not received, avoid the obstacle according to the first obstacle information.

That is, the obstacle detection module 41 is configured to implement the function of detecting the obstacle to obtain the first obstacle information in the step S11 shown in FIG. 1, FIG. 2 and FIG. 3. The collection module 42 is configured to implement the function of obtaining the scene information in the step S12 shown in FIG. 1, FIG. 2 and FIG. 3. The sending module 43 is configured to implement the function of sending the scene information to the remote server in the step S12 shown in FIG. 1, FIG. 2 and FIG. 3. The obstacle avoidance processing module 44 is configured to implement the function of performing navigation according to the navigation path to avoid the obstacle in the steps S13 and S14 shown in FIG. 1, the function of performing navigation according to the first obstacle information in step S14 or according to the second obstacle information to avoid the obstacle in step S21 shown in FIG. 2, and the function of performing navigation according to the first obstacle information in step S14 or the second obstacle information to avoid the obstacle in step S31 shown in FIG. 3.

According to the navigation method provided by the embodiment of the present invention, the obstacle is detected at first to obtain the first obstacle information, meanwhile the scene information is obtained, and the scene information is sent to the remote server; the remote server may obtain the second obstacle information according to the scene information; the accuracy of the second obstacle information is greater than the accuracy of the first obstacle information. That is, by adoption of the navigation method provided by the embodiment of the present invention, the rough information of the obstacle may be obtained by self-detection, and the scene information is sent to the remote server to obtain the accurate information of the obstacle, since the calculation process of obtaining the accurate information of the obstacle is performed in the remote server in the embodiment of the present invention, the requirements of the terminal device on computing resources and storage resources may be effectively reduced. In addition, when a delay occurs in the network, resulting in that the second obstacle information sent by the remote server is not received in time, the navigation may be performed according to the first obstacle information to avoid the obstacle. Therefore, the embodiment of the present invention may reduce or avoid the impact of network delay on real-time obstacle detection and obstacle avoidance.

Optionally, the obstacle avoidance processing module 44 is further configured to: when the second obstacle information sent by the remote server is received, perform navigation according to the second obstacle information to avoid the obstacle.

Optionally, the obstacle avoidance processing module 44 is further configured to: when the second obstacle information sent by the remote server is received, perform navigation according to the first obstacle information and the second obstacle information to avoid the obstacle.

Optionally, the obstacle avoidance processing module 44 is specifically configured to prompt to stop moving according to the first obstacle information; or, prompt to move toward the left side or the right side of the obstacle according to the first obstacle information.

Optionally, the first obstacle information in the above embodiment includes: the distance of the obstacle and the orientation of the obstacle; and the second obstacle information includes: the distance of the obstacle, the orientation of the obstacle, the size of the obstacle, and the number of obstacles.

It should be noted that, all the related contents of the steps involved in the foregoing method embodiment may be quoted to the function descriptions of the corresponding function modules, and thus details are not described herein again.

In hardware implementation, the obstacle detection module 41 may be an ultrasonic radar, an ultrasonic radar array, an infrared sensor, an infrared sensor array, or the like. The collection module 42 may be an image sensing apparatus such as a monocular camera or a binocular camera or the like. The transmitting module 43 may be a communication interface circuit. The obstacle avoidance processing module 44 may be a processor. The programs corresponding to the actions executed by the navigation apparatus may be stored in the memory of the navigation apparatus in the form of software, so that the processor calls the operations corresponding to the above modules.

Figure 5:
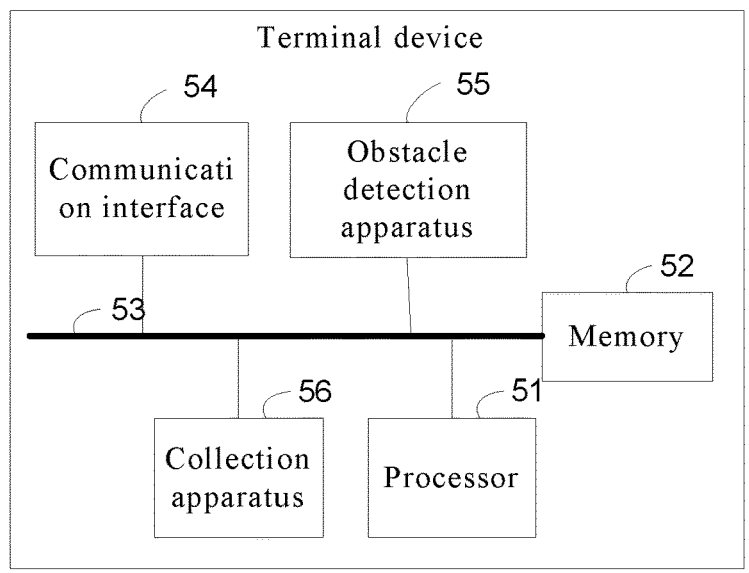
FIG. 5 is a schematic structure diagram of a terminal device provided by an embodiment of the present invention.

In the case that an integrated unit is adopted, FIG. 5 shows a possible structural schematic diagram of the navigation apparatus or the terminal device involved in the above embodiment. The terminal device 500 includes a processor 51, a memory 52, a system bus 53, a communication interface 54, an obstacle detection apparatus 55 and a collection apparatus 56. The memory 52, the communication interface 54, the obstacle detection apparatus 55 and the collection apparatus 56 are coupled to the processor 51, the memory 52 is configured to store a computer execution code, and the computer execution code is configured to control the processor 51 to execute the navigation method provided by any of the above embodiments.

The processor 51 may be a processor and may also be a general name of a plurality of processing elements. For example, the processor 51 may be a central processing unit (central processing unit, CPU). The processor 51 may also be other general purpose processors, a digital signal processor (digital signal processor, DSP), an application specific integrated circuit (application specific integrated circuit, ASIC), a field-programmable gate array (field-programmable gate array, FPGA) or other programmable logic devices, discrete gates or transistor logic devices, discrete hardware components and the like, and the processor may implement or execute logic boxes, modules and circuits of various examples described in combination with the contents disclosed by the present invention. The general purpose processor may be a microprocessor or the processor may also be any conventional processor or the like. The processor 51 may also be a dedicated processor, and the dedicated processor may include at least one of a baseband processing chip, a radio frequency processing chip and the like. The processor may also be a combination for implementing a computing function, for example, a combination including one or more microprocessors, a combination of a DSP and a microprocessor, and the like. Further, the dedicated processor may further include a chip having other dedicated processing functions of the apparatus.

The memory 52 is configured to store a computer execution code, the processor 51 is connected with the memory 52 via a system bus 53, when an electronic device is in operation, the processor 51 is configured to execute the computer execution code stored in the memory 52 to execute any of the navigation methods provided by the embodiment of the present invention, for example, the processor 51 is configured to support the electronic device to execute the steps S13, S14 shown in FIG. 1, the step S21 shown in FIG. 2, the step S31 shown in FIG. 3, and/or applied to other processes of the technology described herein, the specific navigation method may refer to the related descriptions in the above context and the drawings, and thus are not repeatedly described herein again.

The system bus 53 may include a data bus, a power bus, a control bus and a signal state bus and the like. For the sake of clarity in the present embodiment, various buses are illustrated as the system bus 53 in FIG. 5.

The communication interface 54 may specifically be a transceiver on the apparatus. The transceiver may be a wireless transceiver. For example, the wireless transceiver may be an antenna or the like of the apparatus. The processor 51 communicates with other devices via the communication interface 54, for example, if the apparatus is a module or component in the terminal device, the apparatus is applied to the data interaction with other modules in the electronic device.

The steps of the method described in combination with the contents disclosed by the present invention may be implemented in the form of hardware and may also be implemented by a processor executing software instructions. The embodiment of the present invention further provides a storage medium, for storing computer software instructions used by the electronic device shown in FIG. 5, which contain program codes designed to execute the navigation method provided by any of the above embodiments. The software instructions may be composed of corresponding software modules, and the software modules may be stored in a random access memory (English: random access memory, abbreviation: RAM), a flash memory, a read only memory (English: read only memory, abbreviation: ROM), an erasable programmable read-only memory (English: erasable programmable ROM, abbreviation: EPROM), an electrically erasable programmable read-only memory (English: electrical EPROM, abbreviation: EEPROM), a register, a hard disk, a mobile hard disk, a CD-ROM (CD-ROM) or any other form of storage medium known in the art. An exemplary storage medium is coupled to the processor, so that the processor may read information from and write information to the storage medium. Of course, the storage medium may also be a constituent part of the processor. The processor and the storage medium may be located in an ASIC. Additionally, the ASIC may be located in a core network interface device. Of course, the processor and the storage medium may also exist as discrete components in the core network interface device.

The embodiment of the present invention further provides a computer program product, the computer program product may be directly loaded into an internal memory of a computer and contains software codes, and the computer program may implement the navigation method provided by any one of the above embodiments after being loaded and executed by the computer.

Those skilled in the art should be aware that, in one or more examples described above, the functions described in the present invention may be implemented by hardware, software, firmware, or any combination thereof. When implemented by the software, these functions may be stored in a computer readable medium or transmitted as one or more instructions or codes on the computer readable medium. The computer readable medium includes a computer storage medium and a communication medium, wherein the communication medium includes any medium that may conveniently transfer the computer program from one place to another. The storage medium may be any available medium that may be accessed by a general purpose or special purpose computer.

The foregoing descriptions are merely specific embodiments of the present invention, but the protection scope of the present invention is not limited thereto. Any skilled one who is familiar with this art could readily think of variations or substitutions within the disclosed technical scope of the present invention, and these variations or substitutions shall fall within the protection scope of the present invention. Accordingly, the protection scope of the present invention should be subject to the protection scope of the claims.

The invention claimed is:
1. A navigation method, comprising:
  detecting an obstacle to obtain first obstacle information;
  obtaining scene information and sending the scene information to a remote server, so that the remote server obtains and sends second obstacle information according to the scene information;

wherein the accuracy of the second obstacle information is greater than the accuracy of the first obstacle information; and in a condition that the second obstacle information sent by the remote server is not received, prompting to stop moving according to the first obstacle information, or prompting to move toward the left side or the right side of the obstacle according to the first obstacle information; and in a condition that the second obstacle information sent by the remote server is received, a distribution of obstacles according to the second obstacle information is converted to a coordinate system of a map to obtain a distribution map of the obstacles, and local dynamic path planning is performed according to the distribution map, and prompting to move according to a planned path generated by the local dynamic path planning;

wherein the first obstacle information comprises: the distance of the obstacle and the orientation of the obstacle; and the second obstacle information comprises: the distance of the obstacle, the orientation of the obstacle, the size of the obstacle and number of obstacles.

2. A terminal device, comprising: a processor, a memory, a communication interface, an obstacle detection apparatus and a collection apparatus, wherein the memory, the communication interface, the obstacle detection apparatus and the collection apparatus are coupled to the processor, the memory is configured to store a computer execution code, and the computer execution code is configured to control the processor to execute the navigation method according to claim 1.

3. A non-transitory computer storage medium, for storing computer software instructions used by the terminal device according to claim 2, which contains program code designed to execute a navigation method comprising:

detecting an obstacle to obtain first obstacle information;

obtaining scene information and sending the scene information to a remote server, so that the remote server obtains and sends second obstacle information according to the scene information wherein the accuracy of the second obstacle information is greater than the accuracy of the first obstacle information; and in a condition that the second obstacle information sent by the remote server is not received, prompting to stop moving according to the first obstacle information, or prompting to move toward the left side or the right side of the obstacle according to the first obstacle information; and in a condition that the second obstacle information sent by the remote server is received, a distribution of obstacles according to the second obstacle information is converted to a coordinate system of a map to obtain a distribution map of the obstacles, and local dynamic path planning is performed according to the distribution map, and prompting to move according to a planned path generated by the local dynamic path planning;

wherein the first obstacle information comprises: the distance of the obstacle and the orientation of the obstacle; and the second obstacle information comprises: the distance of the obstacle, the orientation of the obstacle, the size of the obstacle and number of obstacles.

\* \* \* \* \*